United States Patent [19]

Steen

[11] 4,027,898
[45] June 7, 1977

[54] LEVEL LOAD LEAF SPRING DROP AXLE

[75] Inventor: Buster M. Steen, Seagoville, Tex.

[73] Assignee: Southwest Wheel and Manufacturing Company, Dallas, Tex.

[22] Filed: Apr. 7, 1976

[21] Appl. No.: 674,507

[52] U.S. Cl. .............................. 280/720; 267/19 R
[51] Int. Cl.² ......................................... B60G 11/04
[58] Field of Search ......... 280/718, 720; 267/19 R, 267/19 A, 41, 54 R, 56

[56] References Cited
UNITED STATES PATENTS

| | | | |
|---|---|---|---|
| 2,596,655 | 5/1952 | Converse | 267/19 A |
| 2,914,340 | 11/1959 | Black | 280/720 |

*Primary Examiner*—Philip Goodman
*Attorney, Agent, or Firm*—Richards, Harris & Medlock

[57] ABSTRACT

Disclosed is a level load spring axle assembly for trailers and the like which has a main shaft rotatably mounted on the frame of a vehicle by a pair of spaced bearing brackets. A pair of parallel extending spaced crank arms are fixed to each end of the main shaft on either side of each of the bearing brackets. The crank arms extend transverse to the length of the main shaft. Wheel spindles are mounted to extend parallel to the main shaft from each of the outer crank arms. A spring follower is rigidly coupled between the crank arms coaxial with the wheel spindles. A leaf spring is attached to the bearing brackets which in turn may be attached to the frame of the vehicle. The spring is narrower in width than the space between the pairs of crank arms. The spring has a first portion which extends away from the main shaft and a second curved portion which extends from the end of the first portion back in a direction toward the main shaft. A third portion extends from the second portion and forms a hook of a size to engage the spring follower pin.

5 Claims, 4 Drawing Figures

LEVEL LOAD LEAF SPRING DROP AXLE

BACKGROUND OF THE INVENTION

The present invention relates to vehicle suspension systems. In another aspect, this invention relates to a new and improved level load leaf spring drop axle.

In the construction of vehicular trailers or the like, level load drop axles have been used for suspension systems. For purposes of description in this application, the phrase "level load" axle is meant to include axles which provide a uniform side-to-side drop to a vehicle even though the loading is eccentric. These systems are of particular use in vehicular trailers wherein tipping to one side or the other can cause the load to be unstable. One of these systems is illustrated in the U.S. Pat. to Misic, No, 2,724,589, issued Nov. 22, 1975.

Although these prior art systems have served their purpose, they have not been entirely satisfactory under all conditions of service. Therefore, according to the present invention, an improved level load leaf spring drop axle is provided wherein a single mounting bracket is utilized to attach both the spring and the axle to the vehicle and wherein a leaf type spring is used having a spring constant that increases as the deflection of the wheels increases. In addition, the axle is formed with parallel-spaced crank arms with the leaf spring positioned between the crank arms whereby interference between the crank arms and spring is eliminated and maximum travel of the crank arms is permitted. In addition, eccentric loading on the crank arm is minimized by placing the spring follower between a pair of parallel spaced crank arms.

The advantages and other features of the present invention will be readily appreciated by those of ordinary skill in the art as the same becomes better understood by reference to the following Detailed Description when considered in connection with the accompanying Drawings in which:

DESCRIPTION OF THE PREFERRED EMBODIMENT

Figure 2:
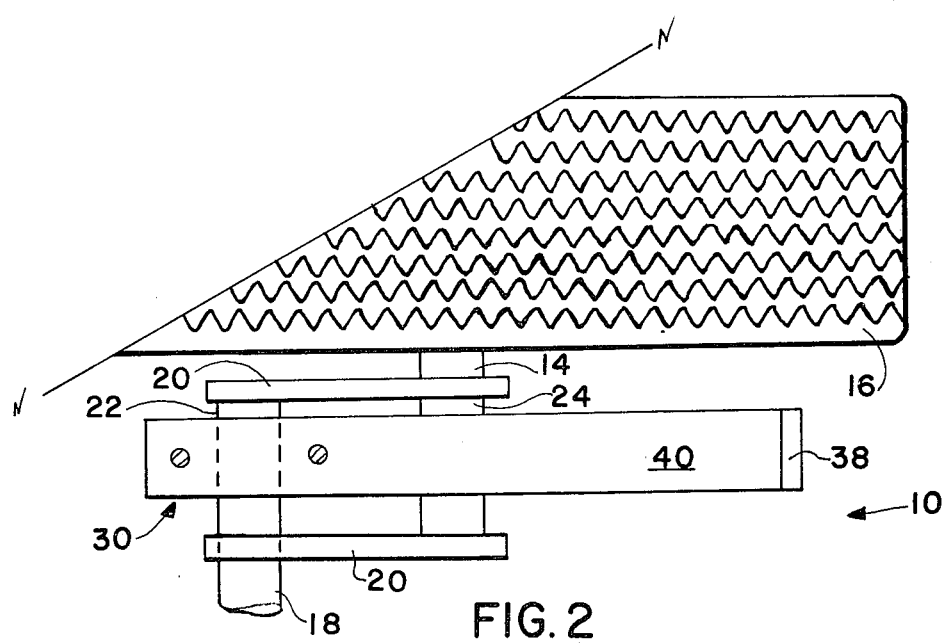
FIG. 2 is a partial sectional view taken on line 2—2 of FIG. 1, looking in the direction of the arrows.
Figure 4:
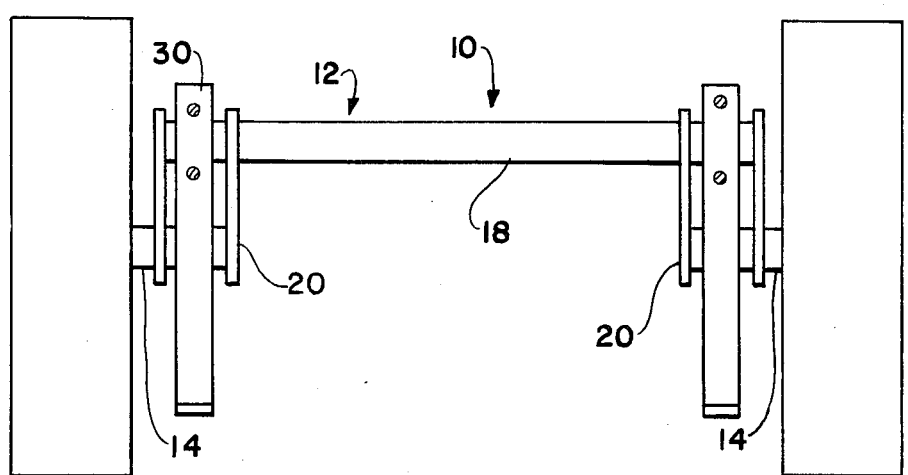
FIG. 4 is a view of the axle assembly of the present invention.

Referring now to the Drawings wherein like reference characters designate like or corresponding parts throughout their several views, there is illustrated a level load leaf spring axle assembly 10 for use on trailers or other vehicles. Assembly 10 comprises a main shaft 12 with wheel spindles 14 for mounting conventional pneumatic tired wheels thereon. Wheel spindles 14 are positioned on the opposite ends of the axle assembly and are coaxially aligned. As can be seen in FIG. 4, the main shaft 12 has a main shaft 18 which extends parallel to and is spaced from the wheel spindles 14. A pair of crank arms 20 rigidly connect each of the wheel spindles 14 to the main shaft 18. In FIG. 2, it can be seen that crank arms 20 are positioned on each end of main shaft 18 and extend in a spaced parallel relationship transverse to the length of main shaft 18.

As can be seen particularly in FIGS. 2 and 4, bearing support brackets 30 rotatably engage the main shaft 18 on the bearing portions 22. Portions 22 are positioned between the two crank arms 20. Bearing bracket 30 is used to rotatably couple main shaft 18 to the frame 34 of the vehicle as will be hereinafter described. This configuration provides for rotation of main shaft 18 about its longitudinal axis in the forward and reverse directions of arrow 32.

In a similar manner, crank arms 20 being rigidly fixed to main shaft 18 are free to rotate about the longitudinal axis of main shaft 18 in the forward and reverse direction of arrow 32. This pivotal movement of crank arms 20 in turn allows wheels spindles 14 to rotate about the axis of main shaft 18 whereby the relative distance between the wheel spindles and the frame of the vehicle is varied. Leaf springs 38 and back up plates 40 are fastened between bearing brackets 30 and the frame 34. Both leaf springs 33 and plates 40 are provided with bores which mate with corresponding bores in brackets 30 whereby fasteners 36 are used to attach the spring-bracket assembly to frame 34. The back up plates 40 in operation acts as an additional leaf in the spring and can be removed if desired.

Bearing brackets 30 each have upper and lower sections 42 and 44 attached together by fasteners 46. These upper and lower sections 42 and 44 contain a bearing surface (not shown) and clamp around portion 22 to allow assembly of the device.

As can be seen particularly in FIG. 2, both spring 38 and back up plate 40 are narrower than the width of the space between the two crank arms 20. This avoids interference between the crank arms and the leaf spring during relative movement of the crank arms.

The leaf spring 38 and back up plate 40 extend in a direction from the bracket 30 transverse to the length of the main shaft 18. The leaf spring 38 diverges from the back up plate 40 adjacent to the end thereof. The leaf spring 38 extends downwardly and back toward the main shaft 18. The leaf spring 38 terminates in a curved or hooked portion 56.

Figure 1:
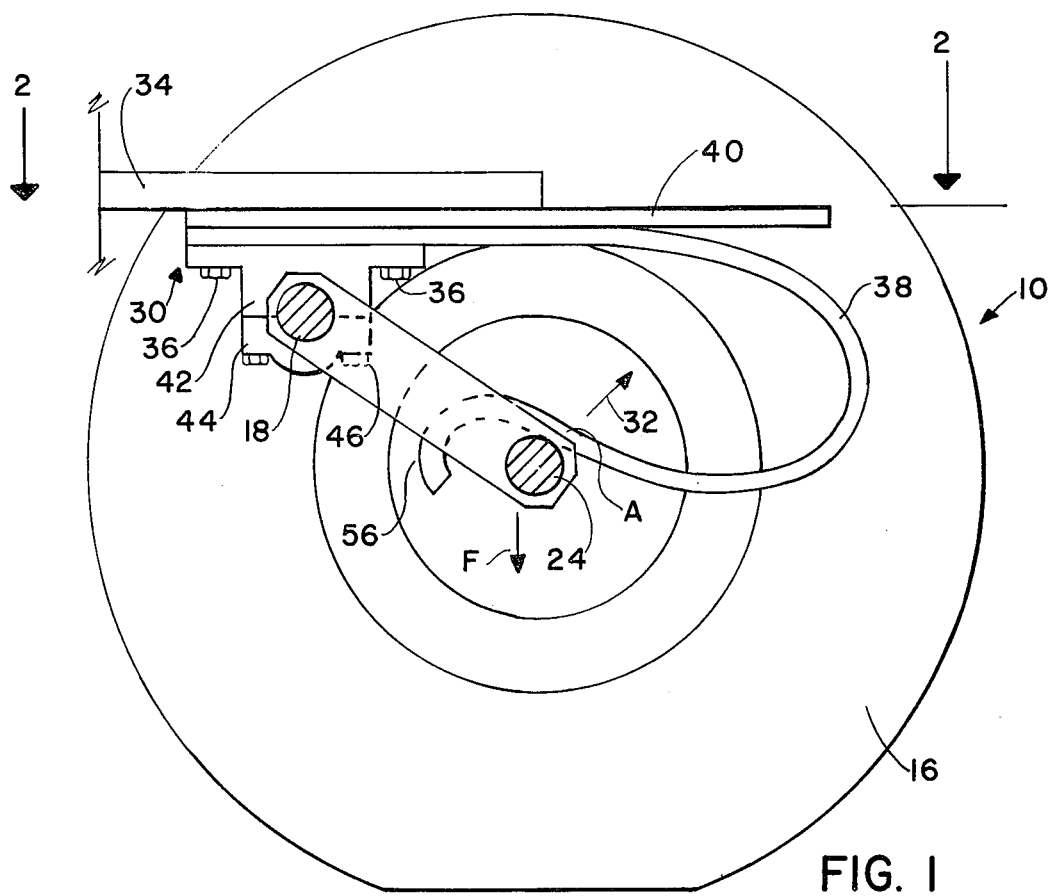
FIG. 1 illustrates a side elevation of a portion of the spring axle assembly of the present invention taken from under the vehicle in a direction out toward the wheel.
Figure 3:
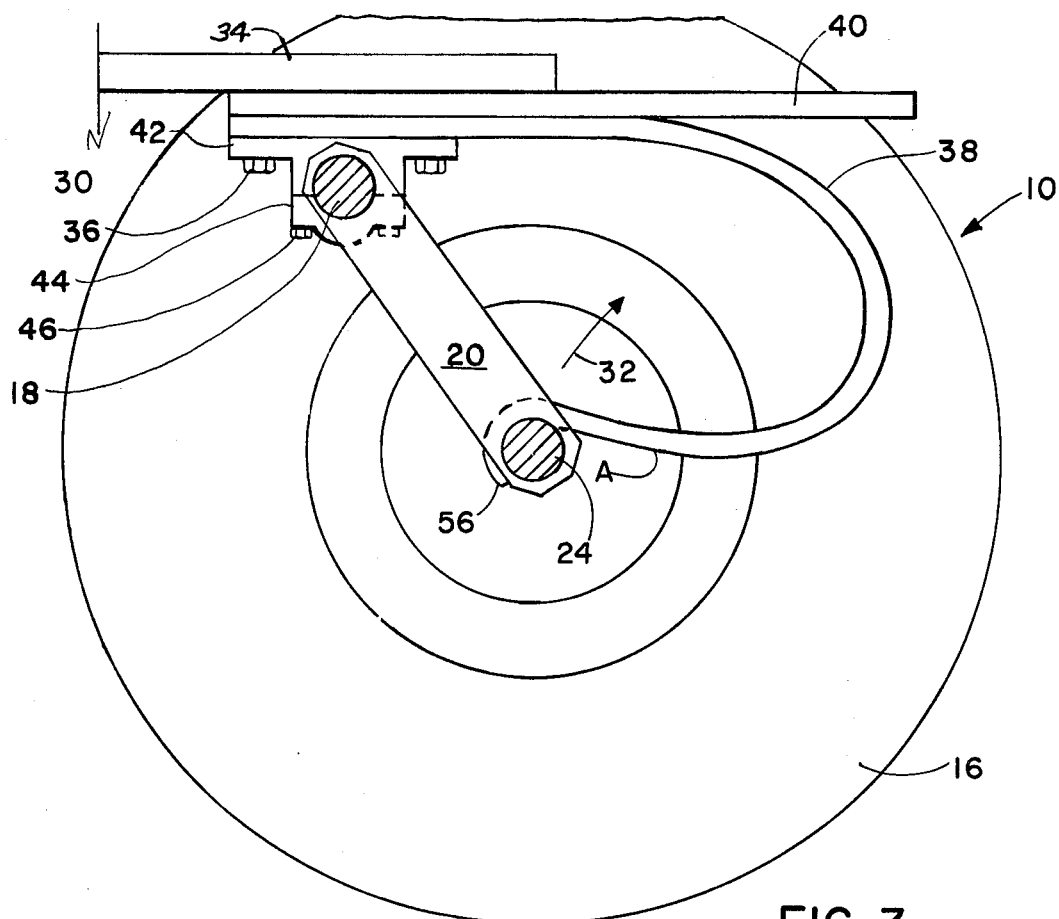
FIG. 3 is a view identical to FIG. 1 with the wheel illustrated in the unloaded condition.

The operation of the axle assembly 10 will be described by reference to FIGS. 1 and 3. In FIG. 1, the assembly 10 is illustrated in a loaded condition. In FIG. 3, the assembly 10 is illustrated in the unloaded condition. As was previously pointed out, the crank arms 20, spindles 14 and spring follower 24 are free to rotate with the shaft 18 in the forward and reverse directions of arrow 32. In the position illustrated in FIG. 1, the spring 38 has an effective length which is determined by the contact line between the spring follower 24 and the spring 38. This contact line is identified for purposes of description by reference A.

In the embodiment illustrated in FIG. 1, the spring 38 is normally biased to cause a force in the direction of arrow F to be acting on the spring follower 24. This in turn tends to resiliently urge the spring follower 24 to rotate in the reverse direction of arrow 32. Thus if the loads were removed from the vehicle, crank arms 20 would rotate to the position illustrated in FIG. 3 with the follower 24 resting in the hooked portion 56 of the spring 38. This hooked portion 56 prevents further rotation of the arms 20 in the reverse direction of arrow 32 in situations where the wheels 16 leave the ground and the like. As the load is increased on the vehicle and transferred through the assembly to the frame 34, the crank arms 20 will tend to rotate in the direction of arrow 32. Likewise, the spring follower 24 will move from the position resting in the hooked portion 56 (illustrated in FIG. 3) to the contact point A (illustrated in FIG. 1). This movement of the follower 24 from the hooked portion 56 in a direction toward the point A shortens the effective length of the spring and thus increases the spring constant as the load increases. If the load is further increased, crank arms 20 will move to swing further in the direction of arrow 32 and thus effectively shortening the length of the spring 38 and even further increasing the spring constant. In this manner, a spring constant will increase as the load increases and will decrease as the load or deflection decreases.

It is also important to note that the crank arms 20 are positioned in a spaced parallel relationship to each other and are spaced on either side of the spring 38, thus preventing any interfering contact therebetween during operation of the device.

It is envisioned, of course, that many alterations and changes in the disclosed embodiment of the present invention could be made by those of ordinary skill in the art without departing from the spirit and scope of the invention as described in the appended claims.

What is claimed is:

1. In the spring axle assembly for a vehicle comprising:
   a pair of spaced bearing brackets,
   a main shaft rotatably journaled in said brackets,
   a pair of parallel spaced crank arms rigidly fixed to each end of said main shaft on opposite sides of said bearing brackets,
   wheel mounting means rigidly fixed to each pair of said crank arms at points remote from said main shaft and extending parallel thereto, a spring follower means extending between each of said crank arm pairs for providing a spring follower surface positioned between said crank arms, and leaf spring means connected to each of said mounting brackets and extending transverse to the length of said main shaft and positioned between said pairs of crank arms whereby interference between said crank arms and said spring is prevented, said spring means being narrower than the width of the space between said crank arm pairs, said spring means having a first portion extending from said bracket away from said main shaft and a second portion extending from the end of said first portion and curved in a direction back toward and parallel to said first portion, and a third hooked portion coupled to the end of said second portion.

2. The assembly of claim 1 additionally comprising a second leaf coupled to said bracket adjacent to said first spring portion on the side opposite said bearing portion.

3. The assembly of claim 1 wherein said bearing bracket comprises a two-piece bracket bolted together with a bearing means therebetween for rotatably engaging said main shaft.

4. The assembly of claim 1 wherein said bracket means comprises a bracket having flanges thereon and fasteners extending through bores in said flanges and mating with correspondingly spaced bores in said spring means for attaching said spring means and said bracket to said vehicle.

5. The assembly of claim 1 wherein flanges are formed on said bearing bracket for attaching said bearing bracket to the frame of said vehicle.

* * * * *

UNITED STATES PATENT AND TRADEMARK OFFICE
CERTIFICATE OF CORRECTION

PATENT NO. : 4,027,898
DATED : June 7, 1977
INVENTOR(S) : Buster M. Steen

It is certified that error appears in the above-identified patent and that said Letters Patent are hereby corrected as shown below:

Column 1, line 17, "No," should be --No.--

Column 2, line 21, "springs 33" should be --springs 38--.

Signed and Sealed this twenty-third Day of August 1977

[SEAL]

Attest:

RUTH C. MASON
Attesting Officer

C. MARSHALL DANN
Commissioner of Patents and Trademarks